United States Patent [19]

Saito et al.

[11] Patent Number: 4,827,335

[45] Date of Patent: May 2, 1989

[54] COLOR IMAGE READING APPARATUS WITH TWO COLOR SEPARATION FILTERS EACH HAVING TWO FILTER ELEMENTS

[75] Inventors: Tutomu Saito, Yokohama; Akito Iwamoto, Kamakura, both of Japan

[73] Assignee: Kabushiki Kaisha Toshiba, Kawasaki, Japan

[21] Appl. No.: 88,119

[22] Filed: Aug. 21, 1987

[30] Foreign Application Priority Data

Aug. 29, 1986 [JP] Japan ................................ 61-201718
Jun. 30, 1987 [JP] Japan ................................ 62-161039

[51] Int. Cl.$^4$ .......................... G03F 3/08; H04N 1/46
[52] U.S. Cl. ........................................ 358/75; 358/80
[58] Field of Search ................... 358/75, 75 IJ, 78, 80

[56] References Cited

U.S. PATENT DOCUMENTS 4,518,988  5/1985  Saitoh et al. ......................... 358/75

FOREIGN PATENT DOCUMENTS 60-121874  6/1985  Japan .............................. 358/75
60-178768  9/1985  Japan .............................. 358/75
60-263564  12/1985  Japan .
61-218263  9/1986  Japan .
61-288663  12/1986  Japan .
2183120  5/1987  United Kingdom .

Primary Examiner—James J. Groody
Assistant Examiner—Randall S. Svihla
Attorney, Agent, or Firm—Oblon, Fisher, Spivak, McClelland & Maier

[57] ABSTRACT

A color reading apparatus having a document table upon which the documents to be read are placed. The document table is formed of transparent glass which is illuminated by a light source, the light source being driven by a light source driver. An image of a document to be read is focused on an image sensor through a focusing lens and through first and second color separation filters. Each of the color separation filters have first and second filter elements which are formed on a transparent substrate and are aligned in the direction from which a photosensor array of the image sensor performs scanning. The image sensor is driven by a CCD driver and generates an image signal corresponding to the focused image. The CCD driver is controlled by a control circuit which is connected to a reference clock. The image signal output from the image sensor is amplified by an amplifier and converted to a digital signal by an A/D converter. The digital signal is then supplied to an image signal processing circuit. The two color separation filters are periodically moved such that the four filter elements are inserted between the lens and the image sensor in various combinations of two filter elements, thereby enabling at least three color image signals to be obtained from said image sensor.

19 Claims, 9 Drawing Sheets

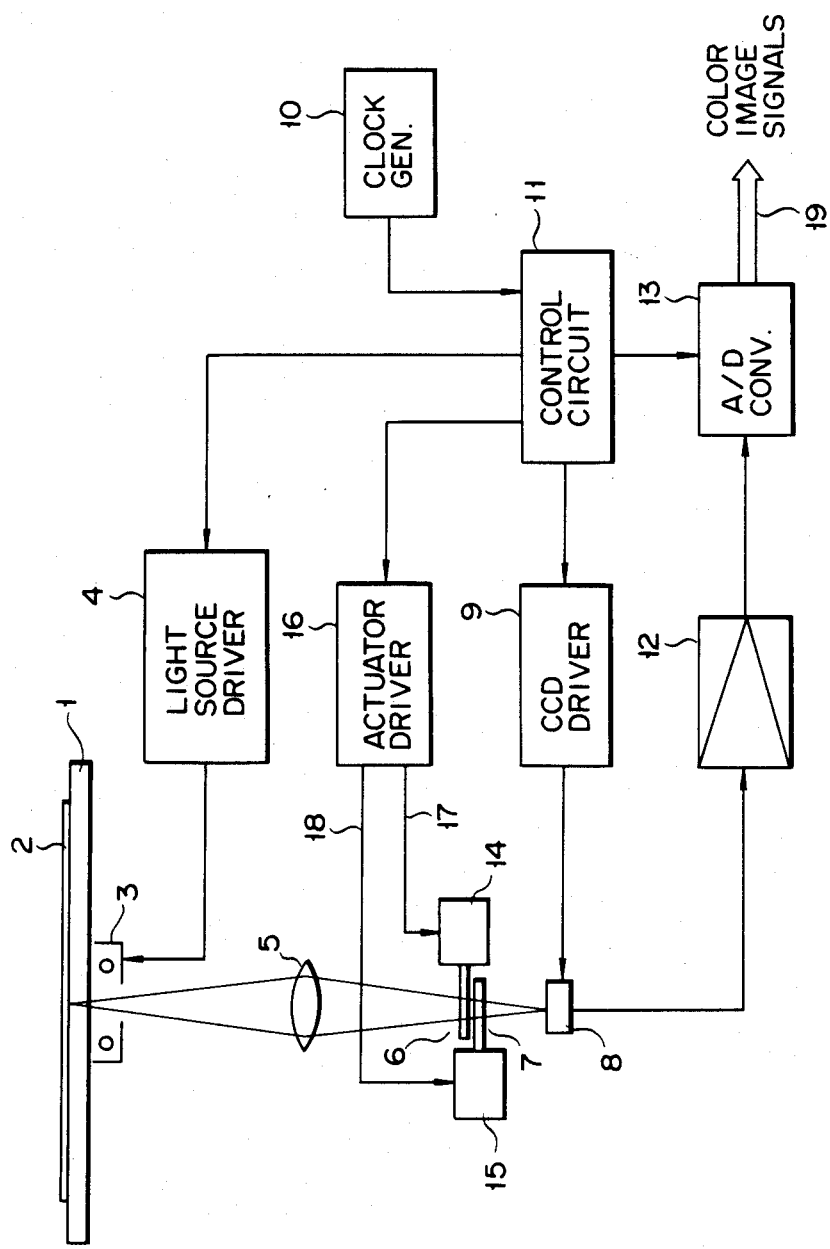
F I G. 1

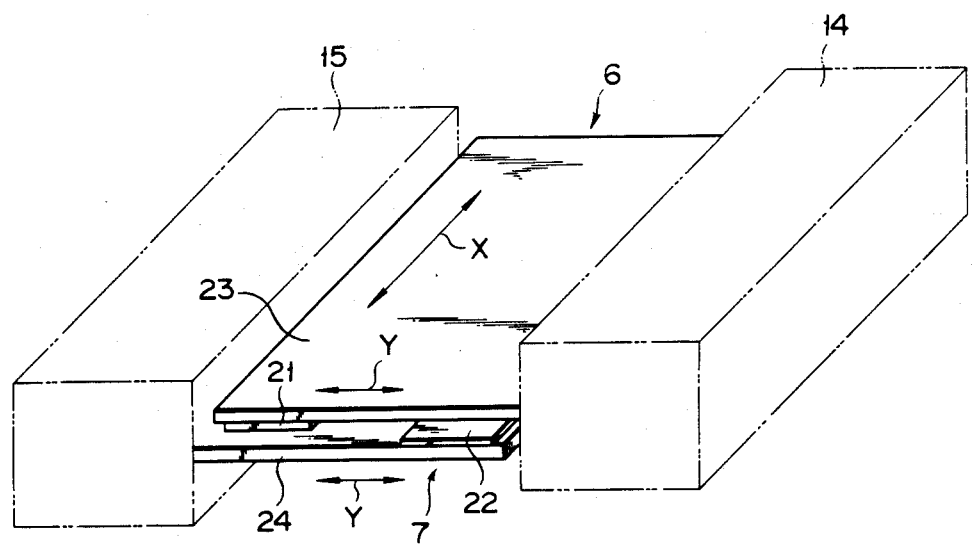
F I G. 2
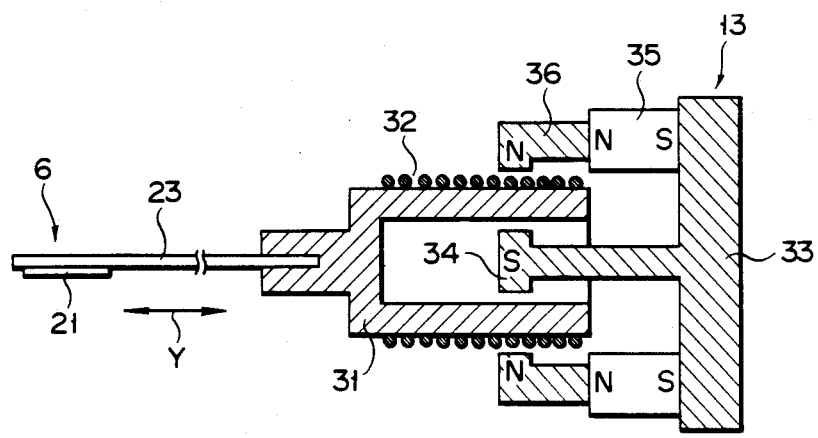
F I G. 3

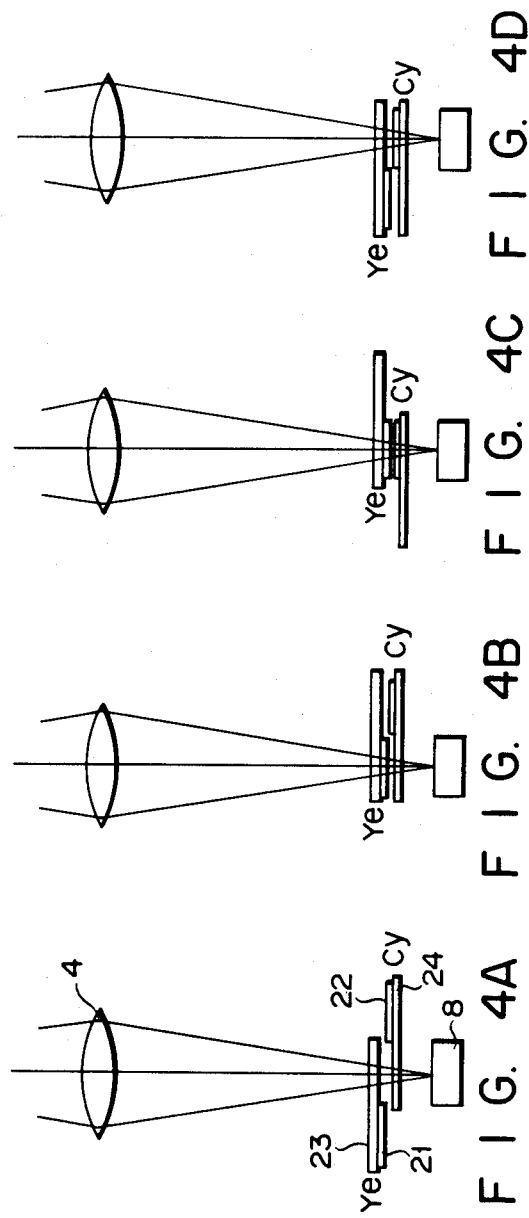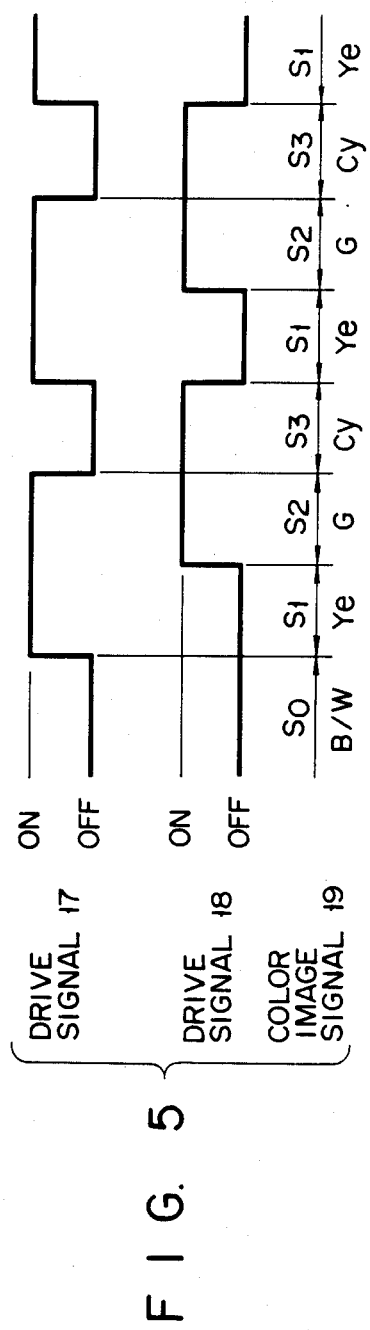

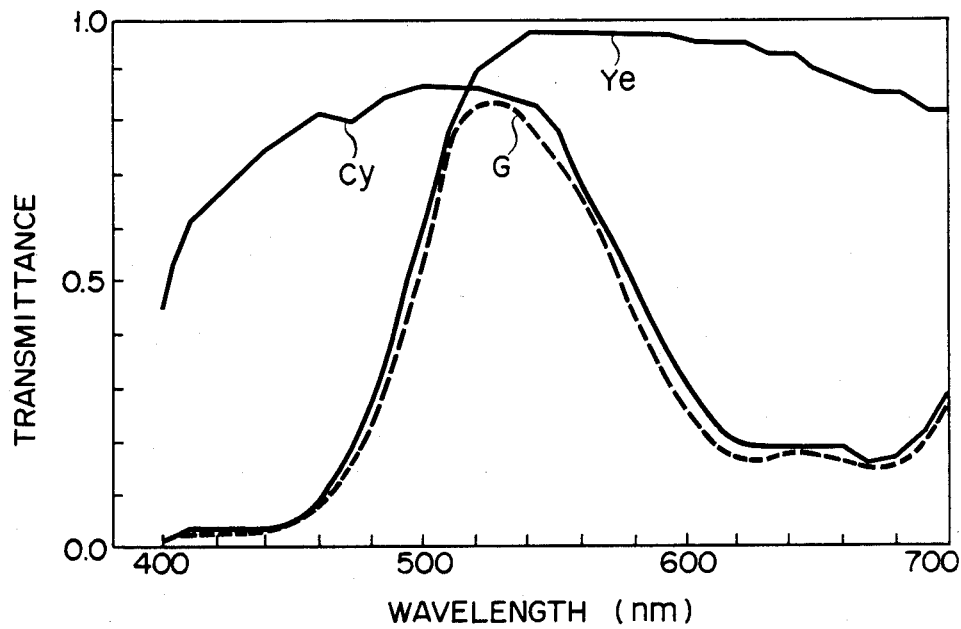
FIG. 6
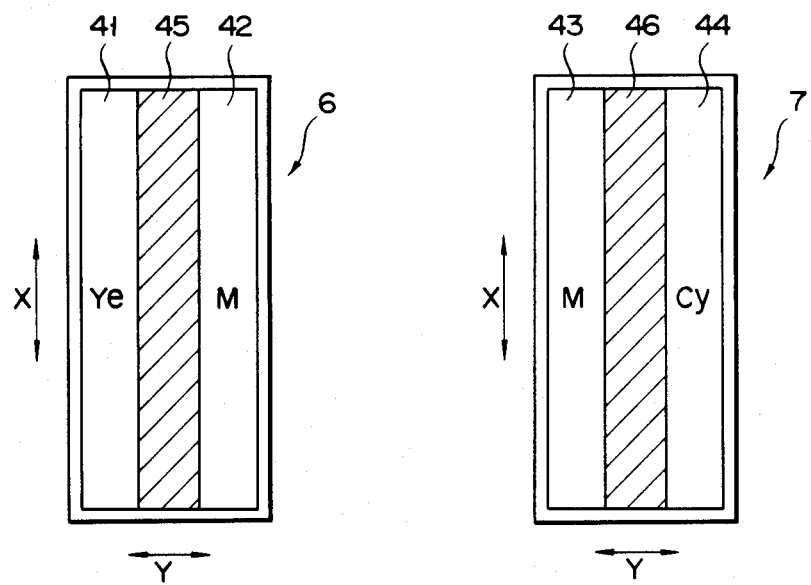
FIG. 7A
FIG. 7B

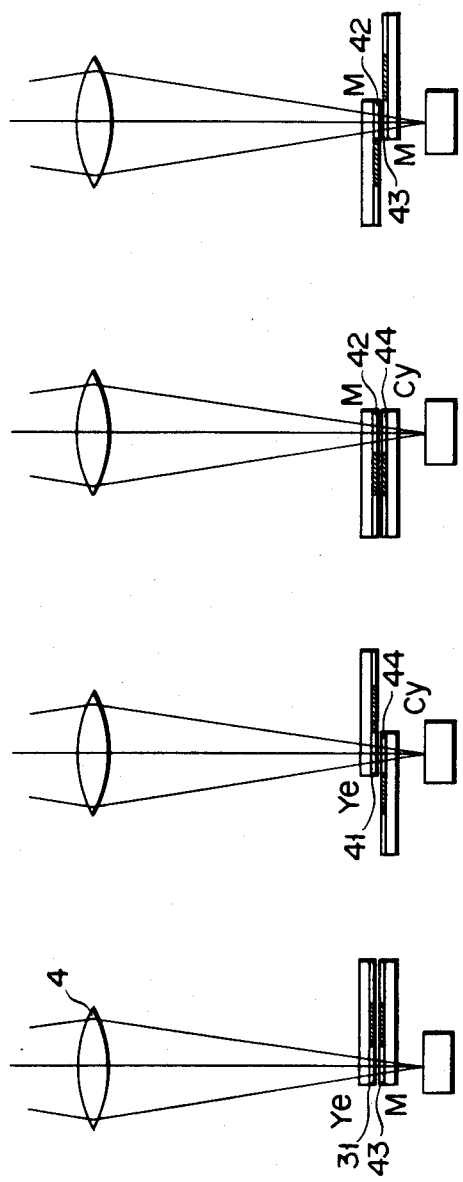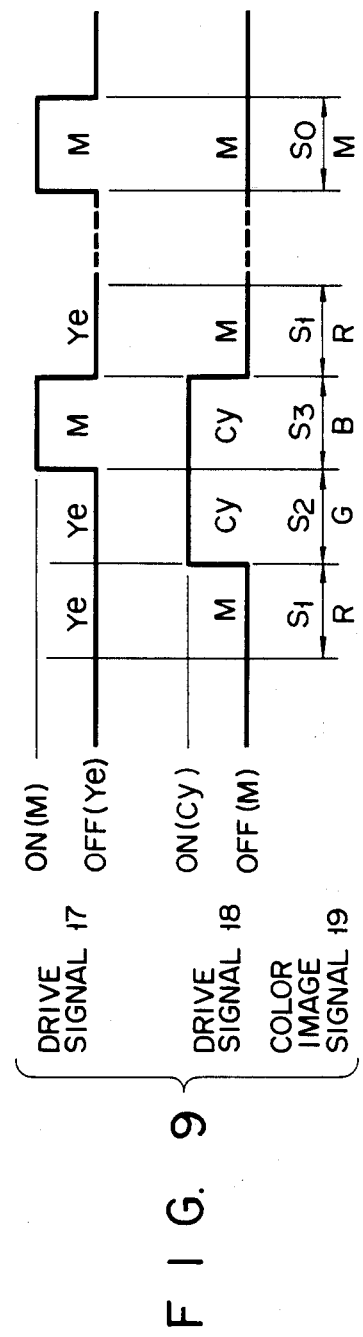

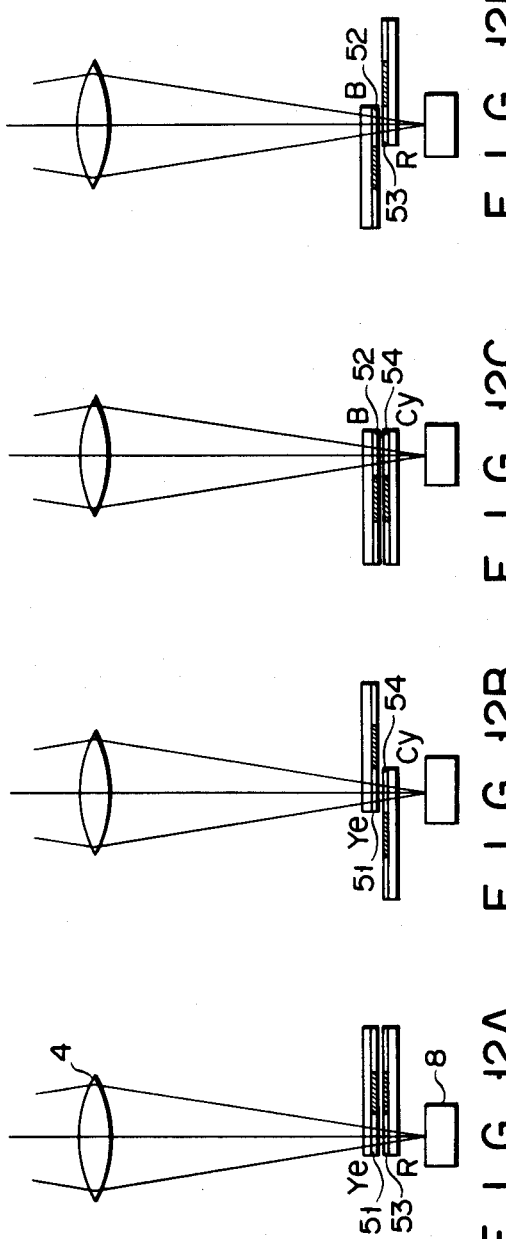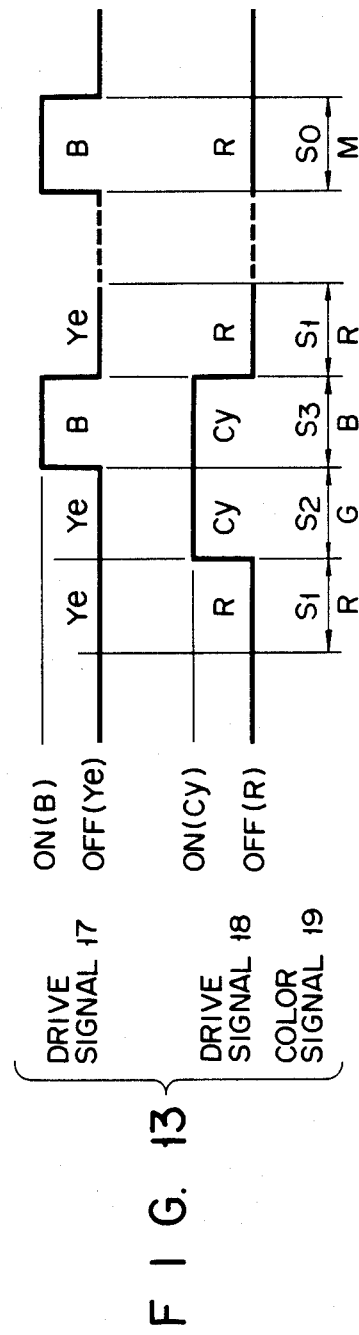

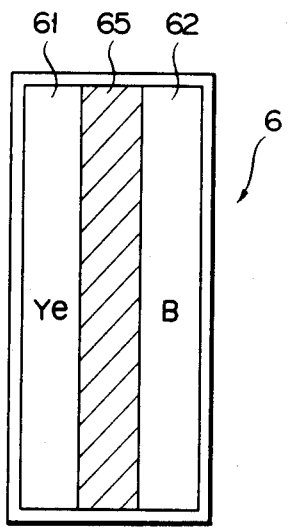
F I G. 14A
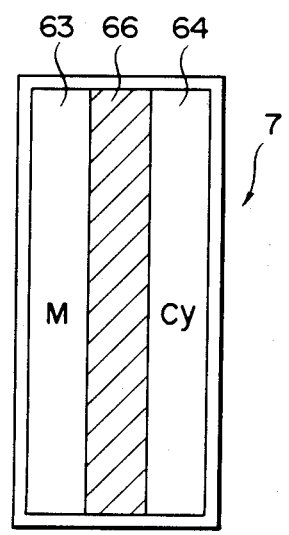
F I G. 14B
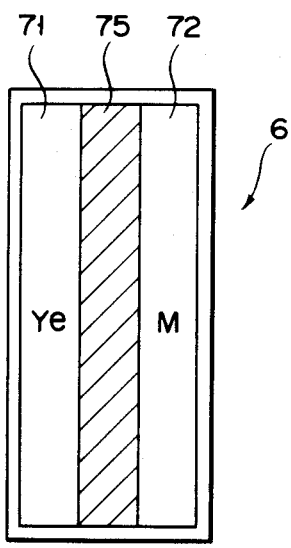
F I G. 15A
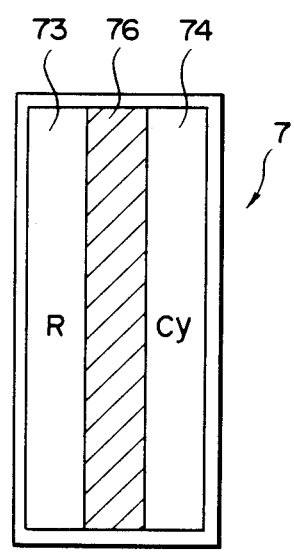
F I G. 15B

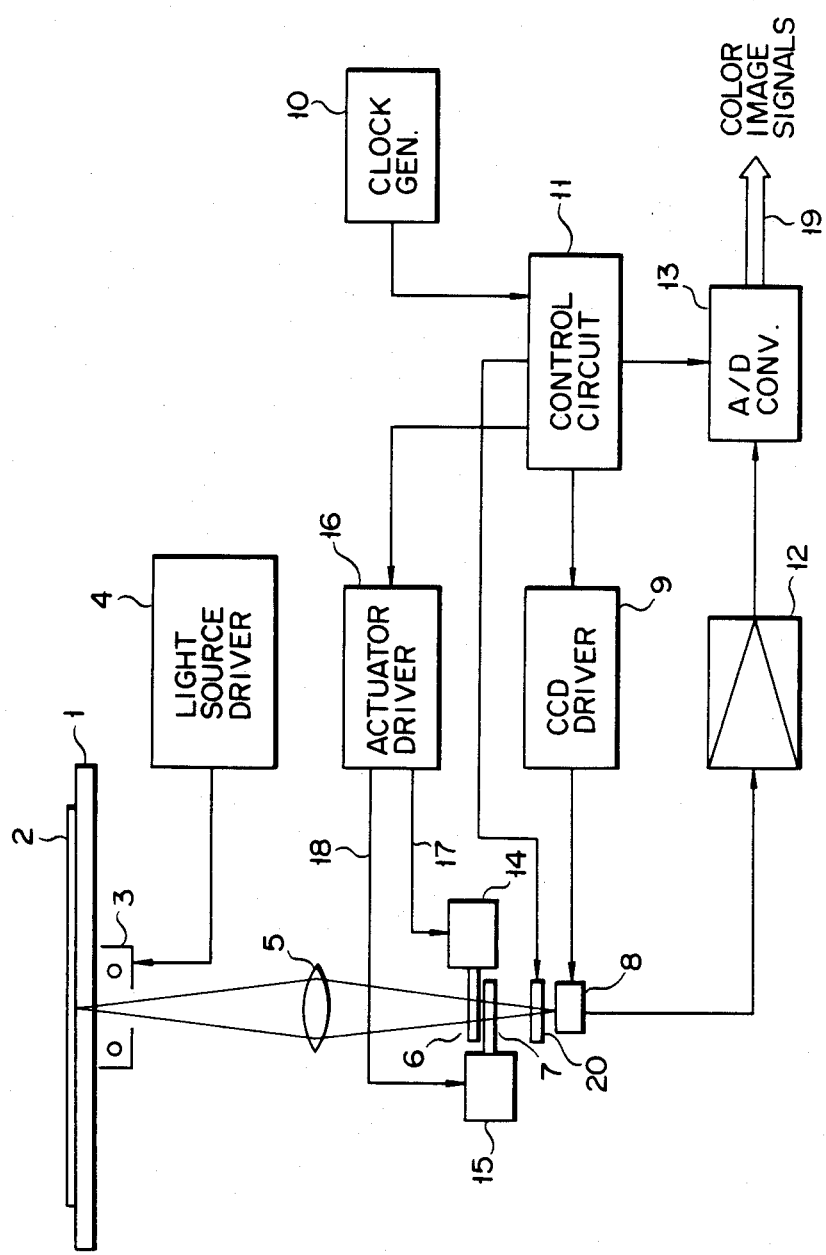
F I G. 16

COLOR IMAGE READING APPARATUS WITH TWO COLOR SEPARATION FILTERS EACH HAVING TWO FILTER ELEMENTS

BACKGROUND OF THE INVENTION

The present invention relates to a color image reading apparatus used for a color copier, a color scanner, a color facsimile system and the like and, more particularly, to a color image reading apparatus for obtaining a color image signal upon switching of a color separation filter arranged along an optical passage for imaging an object image on an image sensor.

In one method for reading a color image printed on a document, at least one color separation filter is arranged along an optical passage for guiding and focusing light reflected by a document surface onto an image sensor constituted by a photosensor array, and the color separation filter is mechanically switched. A color image reading apparatus described in Japanese Patent Disclosure (Kokai) No. 60-263564 is known. In this apparatus, a color separation filter has R (red), G (green), and B (blue) filter elements linearly formed on a single plane. The filter is moved by an actuator in a direction perpendicular to an alignment direction of a photosensor array, so that each filter element is selectively inserted in the optical passage. The color separation filter must be stably stopped at three points in the moving direction, and must be moved by a long distance corresponding to a total of the widths of at least two filter elements. Since the moving distance of the color separation filter is large, the image reading speed cannot be improved. If the moving speed of the color separation filter is increased to improve the image reading speed, positioning precision of the color separation filter is degraded.

In the color image reading apparatus described in Japanese Patent Disclosure (Kokai) No. 61-218263, independent R, G, and B color separation filters are selectively inserted in the optical passage. However, since the installation space for the three color separation filters and three driving means for independently driving these filters must be assured, a distance from the document surface to the image sensor is increased, resulting in a bulky apparatus. The moving distance of the color separation filters is increased in accordance with a distance between the image sensor and the farthest filter from the image sensor. This is because as the filter is separated farther from the image sensor, a width of a light beam is increased, and the width of the filter element must be increased accordingly. In the apparatus described in Japanese Patent Disclosure (Kokai) No. 61-218263, since this distance is large, the width of each filter element must be increased, and hence, the moving distance of the filter is increased.

SUMMARY OF THE INVENTION

It is an object of the present invention to provide a color image reading apparatus which can satisfy both the requirements of high reading speed and high positioning precision of a color separation filter.

It is another object of the present invention to provide a color image reading apparatus which has a simple structure, can be rendered compact, and can shorten a distance between a document surface and an image sensor.

According to the present invention, first and second color separation filters respectively comprising predetermined filter elements are arranged in an optical passage for imaging an image to be read on an image sensor. At least three color image signals are selectively obtained in correspondence with at least three combinations of positional states of the filters in the optical passage established by independently moving the color separation filters.

According to an embodiment of the present invention, the first color separation filter has a first filter element, having a predetermined spectral characteristic, e.g., a yellow filter element, and is movable in a direction perpendicular to the optical passage so that a state wherein the first filter element is located in the optical passage and a state wherein the filter element is deviated from the optical passage can be selectively established. The second color separation filter has a second filter element, having a spectral characteristic different from that of the filter element of the first color separation filter e.g., a cyan filter element. The second color separation filter is located at a position separated from the first color separation filter in the axial direction of the optical passage to be movable in a direction perpendicular to the optical passage so that a state wherein the second filter element is located in the optical passage and a state wherein the filter element is deviated from the optical passage can be selectively established. The first and second color separation filters are respectively moved by first and second drive means so that at least three color image signals, e.g., yellow, green, and cyan image signals are selectively obtained from the image sensor. Of these color image signals, the green image signal can be obtained in a state wherein both the yellow and cyan filter elements are inserted in the optical passage.

According to another embodiment of the present invention, the first color separation filter has first and second filter elements having different spectral characteristics, and is movable in a direction perpendicular to the optical passage so that a state wherein either the first or second filter element is selectively located in the optical passage can be established. The second color separation filter has third and fourth filter elements. The third and fourth filter elements have different spectral characteristics, and the spectral characteristic of at least one filter element is different from those of the first and second filter elements. The second color separation filter is located at a position separated from the first color separation filter in the axial direction of the optical passage to be movable in a direction perpendicular to the optical passage so that a state wherein either the third or fourth filter element is located in the optical passage can be established. These color separation filters are respectively moved by first and second drive means, so that at least three color image signals, e.g., R, G, and B image signals can be selectively obtained from the image sensor.

The first to fourth filter elements respectively employ, e.g., yellow, magenta, magenta, and cyan filter elements. In this case, a red image signal can be obtained when both the yellow and magenta filter elements are inserted in the optical passage. A green image signal can be obtained when both the yellow and the cyan filter elements are inserted in the optical passage. A blue image signal can be obtained when both the magenta and cyan filter elements are inserted in the optical passage. The first to fourth filter elements may also employ yellow, blue, red, and cyan filter elements. In this case, a red image signal can be obtained when both the yellow and red filter elements are inserted in the optical passage. A green image signal can be obtained when both the yellow and cyan filter elements are inserted in the optical passage. A blue image signal can be obtained when the blue and cyan filter elements are inserted in the optical passage. The first to fourth filter elements may also employ yellow, blue, magenta, and cyan filter elements or yellow, magenta, red, and cyan filter elements.

According to the present invention, each of the first and second color separation filters arranged to be separated in the axial direction of the optical passage has one or two filter elements, and the composite spectral characteristic with respect to incident light can be determined by three combinations of the positional states of these filters. Therefore, the filters respectively have two positionally stable points in their moving directions, and need only be moved by a distance corresponding to a width of one filter element. The two filters can be moved at the same time. The following advantages can be obtained as compared with a case using a single color separation filter in which three filter elements are arranged on a single plane. That is, the time required for moving the filters can be shortened, and the reading speed can be improved. Since the moving distance of each filter can be halved, the moving speed can be low, and hence, positioning precision can be improved.

In comparison to an apparatus in which three color separation filters are arranged in an optical passage, since the two color separation filters are adopted, an installation space for the filters and their drive means can be reduced. Thus, the apparatus can be compact. In addition, since the distance between the image sensor and the color separation filter farthest from the image sensor can be shortened, the width of the filter element can be reduced, and the moving distance of the filter can be decreased.

BRIEF DESCRIPTION OF THE DRAWINGS

FIG. 1 is a block diagram showing an arrangement of a color image reading apparatus according to a first embodiment of the present invention;

FIG. 2 is a view showing first and second color separation filters according to the first embodiment;

FIG. 3 is a sectional view of an electromagnetic actuator for driving the color separation filters;

FIGS. 4A to 4D are views showing various combinations of positional states of the first and second color separation filters according to the first embodiment;

FIG. 5 is a view showing waveforms for an actuator drive signal and an output color image signal of the first embodiment in correspondence with FIGS. 4A to 4D;

FIG. 6 is a view showing the spectral characteristics of the first and second color separation filters according to the first embodiment;

FIGS. 7A and 7B are plan views of first and second color separation filters according to a second embodiment of the present invention;

FIGS. 8A to 8D are views showing various combinations of positional states of the first and second color separation filters according to the second embodiment;

FIG. 9 is a view showing waveforms for an actuator drive signal and an output color image signal of the second embodiment in correspondence with FIGS. 8A to 8D;

FIGS. 12A to 12D are views showing various combinations of positional states of the first and second color separation filters according to the third embodiment;

FIG. 13 is a view showing an actuator drive signal and an output color image signal of the third embodiment in correspondence with FIGS. 12A to 12D;

FIGS. 14A and 14B are views showing various combinations of positional states of the first and second color separation filters according to a fourth embodiment of the present invention;

FIGS. 15A and 15B are views showing various combinations of positional states of the first and second color separation filters according to a sixth embodiment of the present invention; and FIG. 16 is a block diagram showing the arrangement of a color image reading apparatus according to the sixth embodiment of the present invention.

DETAILED DESCRIPTION OF THE PREFERRED EMBODIMENTS

Figure 10:
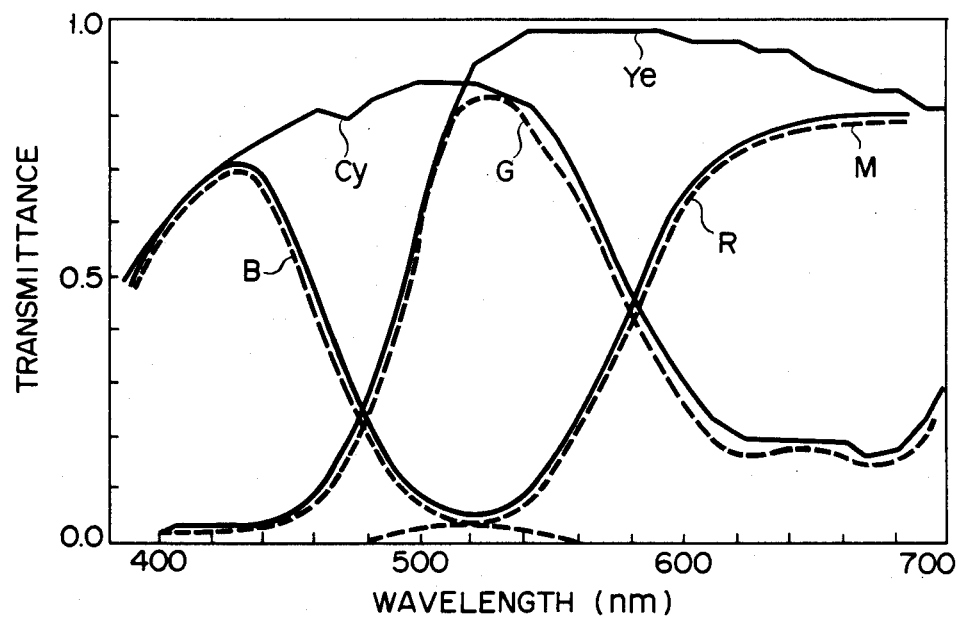
FIG. 10 is a view showing the spectral characteristics of the first and second color separation filters according to the second embodiment.

Referring to FIG. 1 showing a color image reading apparatus according to the first embodiment of the present invention, document 2 placed on document table 1 formed of a transparent glass plate is illuminated with light source 3. Light source 3 is driven by light source driver 4. An image of document 2 is focused on image sensor 8 through focusing lens 5 and first and second color separation filters 6 and 7.

Image sensor 8 employs a CCD line image sensor in which a plurality of photosensors are aligned in a direction perpendicular to the drawing. Image sensor 8 is driven by CCD driver 9, and generates an image signal corresponding to a focused image to be read by scanning (main scanning) in the alignment direction of the photosensor array. CCD driver 9 is controlled by control circuit 11 which is operated based on a reference clock supplied from clock generator 10. The image signal output from image sensor 8 is amplified by amplifier 12. The output signal from amplifier 12 is converted to a digital signal consisting of a proper number of bits, e.g., 8 bits, by A/D converter 13 which is operated in response to a sampling clock from control circuit 11. The digital signal is supplied to an image signal processing circuit (not shown) connected to the output terminal of A/D converter 13.

First and second color separation filters 6 and 7 are arranged as shown in FIG. 2. Referring to FIG. 2, first filter element 21 is, e.g., a yellow filter element, and second filter element 22 is, e.g., a cyan filter element. These filter elements are respectively formed on first and second transparent substrates 23 and 24 along the alignment direction (main scanning direction) of the photosensor array of image sensor 8, as indicated by arrow X. Filters 6 and 7 are respectively supported by actuators 14 and 15 as filter drive means so that filter elements 21 and 22 face each other, and are moved by actuators 14 and 15 in a direction indicated by arrow Y in FIG. 2. Filter elements 21 and 22 are inserted in or removed from an optical passage extending from focusing lens 5 to image sensor 8.

Actuators 14 and 15 generate a displacement of a length (e.g., about 4 mm) corresponding to the width of filter elements 21 and 22 to move filters 6 and 7, and employ moving coil type electromagnetic actuators, as shown in FIG. 3.

Although FIG. 3 illustrates only actuator 14, actuator 15 may have a similar structure. The proximal end portion of transparent substrate 23 for color separation filter 6 is supported by cylindrical movable member 31. Coil 32 is wound around the outer surface of movable member 31. Center pole 34 standing at the central portion of disk-like stationary yoke 33 is inserted inside movable member 31. One magnetic pole surface of ring-like permanent magnet 35 is supported around stationary yoke 33. Ring-like pole 36 is supported on the other magnetic pole surface of permanent magnet 35, and the distal end of pole 36 is directed toward coil 32. When a current is supplied from actuator driver 16 in FIG. 1 to coil 32, an electro-magnetic force is generated in coil 32 by a magnetic flux generated in a gap between poles 34 and 36. Then, filter 6 is moved by the force in the direction indicated by arrow Y through movable member 32.

Actuators 14 and 15 may also employ piezo-electric actuators. As the piezo-electric actuator, a bimorph element or a multilayered actuator can be used. Actuators 14 and 15 are driven by drive signals 17 and 18 supplied from actuator driver 16 controlled by control circuit 11.

The operation of this embodiment will now be described with reference to FIGS. 4A to 4D, 5, and 6. FIGS. 4A to 4D show four combinations of positional states of filters 6 and 7. These four combinations are periodically selected to read a color image. As a color separation method in a color separation filter switching type color image reading apparatus, a line sequential method and a frame sequential method are known. With the line sequential method, the combinations of positional states of filters 6 and 7 are periodically switched for every line, and with the frame sequential method, they are switched for every page. These two color separation methods and the corresponding periodical switching methods of the positional states of filters 6 and 7 are determined by the specifications of the overall system including the color image reading apparatus. Switching of these methods can be accomplished by changing the control timing of control circuit 11.

FIG. 4A shows a state wherein both yellow filter element (to be referred to as Ye filter element hereinafter) 21 of first color separation filter 6 and cyan filter element (to be referred to as Cy filter element hereinafter) 22 in second color separation filter 7 are removed from the optical passage. In this state, image signal 19 obtained from image sensor 8 is a monochrome (B/W) signal.

FIG. 4B shows a state wherein Ye filter element 21 is inserted in the optical passage and Cy filter 22 is removed from the optical passage. In this state, a yellow signal component can be obtained as color image signal 19.

FIG. 4C shows a state wherein both Ye and Cy filter elements 21 and 22 are inserted in the optical passage. Since Ye and Cy filter elements 21 and 22 respectively have the spectral characteristics as represented by curves Ye and Cy in FIG. 6, the composite spectral characteristics of filters 6 and 7 in the state shown in FIG. 4C are equivalent to those of a green filter as indicated by curve G in FIG. 6. Therefore, in this case, a green signal component is obtained as the color image signal. In this invention, the composite spectral characteristics of two filters 6 and 7 are also utilized for color separation.

FIG. 4D shows a state wherein Ye filter element 21 is removed from the optical passage, and only Cy filter element 22 is inserted in the optical passage. In this state, of course, a cyan signal component can be obtained as color image signal 19.

FIG. 5 shows waveforms of drive signals 17 and 18 supplied from actuator driver 16 to actuators 14 and 15 in correspondence with FIGS. 4A to 4D. Filter elements 21 and 22 of filters 6 and 7 are removed from the optical passage when drive signals 17 and 18 are OFF and are inserted in the optical passage when signals 17 and 18 are ON. During period S0, since both drive signals 17 and 18 are OFF, the state shown in FIG. 4A is established, and the B/W signal is generated. During periods S1, S2, and S3, the states shown in FIGS. 4B, 4C, and 4D are respectively established, and the yellow, green, and cyan signal components are generated.

In this manner, when filter elements 21 and 22 of first and second color separation filters 7 and 8 are inserted in or removed from the optical passage, the yellow, green, and cyan signal components can be selectively obtained. Filters 6 and 7 respectively have two positionally stable points in their moving directions. The moving distance of filters 6 and 7 (displacement of actuators 14 and 15) can be a width of filter elements 21 and 22. Therefore, color separation filters 6 and 7 can be quickly moved, and color image reading can be performed at high speed. Since only two color separation filters 6 and 7 are used in the present invention, an area between focusing lens 5 and image sensor 8 for housing the filters and actuators 14 and 15 as their drive means can be decreased as compared to an apparatus using three independent color separation filters, resulting in a compact apparatus. Since the furthest distance between image sensor 8 and filter 6 is small, the width of filter elements 21 and 22, which is determined in correspondence with the width of a light beam, can be decreased. Therefore, the moving distance of filters 6 and 7 can be shortened. Since filter elements 21 and 22 are formed on opposing surfaces of transparent substrates 23 and 24, a gap between filter elements 21 and 22 is small, and the width of the light beam at the position of filter element 21 is only slightly larger than that at the position of filter element 22.

In this apparatus, since both elements 21 and 22 of filters 6 and 7 can be removed from the optical passage, as shown in FIG. 4A, both color and monochrome image reading can be achieved.

Ye and Cy filter elements 21 and 22 of filters 6 and 7 are formed on predetermined regions of transparent substrates 23 and 24. As shown in FIGS. 4A, 4B, 4D, even when one or both of filter elements 21 and 22 are removed from the optical passage, the regions of transparent substrates 23 and 24 on which no filter elements are formed are inserted in the optical passage, so that the optical distance (optical path length) between the surface of document 2 and image sensor 8 can be maintained constant regardless of the positions of filters 6 and 7. Therefore, the focal point of lens 5 always coincides with image sensor 8. Since filter elements 21 and 22 are very thin, e.g., about 1 μm, they have almost no influence on the optical distance.

During the moving process of filters 6 and 7 in order to change the combination of filters, there is a time when only portions of filter elements 21 and 22 are inserted in the optical passage. In this moving state, a signal obtained from image sensor 8 is not a correctly color-separated color image signal. In order to prevent such a signal from being input to the image signal processing circuit, light source driver 4 is controlled by control circuit 11 so as to turn off light source 3 during the moving process of filters 6 and 7.

In the present invention, various modifications of first and second color separation filters 6 and 7 may be made. FIGS. 7A and 7B show first and second color separation filters 6 and 7 according to the second embodiment of the present invention. Filter 6 has Ye filter element 41 and magenta filter element (to be referred to as M filter element hereinafter) 42, as shown in FIG. 7A, and filter 7 has M filter element 43 and cyan filter element (Cy filter element) 44, as shown in FIG. 7B. Elongated light shielding regions 45 and 46 are respectively provided between filter elements 41 and 42 and between elements 43 and 44. The widths of light shielding regions 45 and 46 (the size in the direction indicated by arrow Y) are selected to be equal to or larger than the light beam width at the positions of filters 6 and 7. Arrow X represents the alignment direction of the photosensor array in image sensor 8.

FIGS. 8A to 8D show four combinations of positional states of filters 6 and 7 in the same manner as in FIGS. 4A to 4D. When these four combinations are periodically switched for every line or page, color image reading is performed. FIG. 8A shows a state wherein Ye filter element 41 of filter 6 and M filter element 43 of filter 7 are inserted in the optical passage. Since Ye and M filter elements 41 and 43 respectively have the spectral characteristics as indicated by curves Ye and M in FIG. 10, the composite spectral characteristic of filters 6 and 7 in the state shown in FIG. 8A is equivalent to a red filter characteristic represented by curve R in FIG. 10. Therefore, a red signal component can be obtained as color image signal 19.

FIG. 8B shows a state wherein Ye filter element 41 of filter 6 and Cy filter element 44 of filter 7 are inserted in the optical passage. In this case, the composite spectral characteristic of filters 6 and 7 is equivalent to the green filter characteristic represented by curve G in FIG. 10 in the same manner as in FIG. 4C. Therefore, the green signal component can be obtained as color image signal 19.

FIG. 8C shows a state wherein M filter element 42 of filter 6 and Cy filter element 44 of filter 7 are inserted in the optical passage. The composite spectral characteristic of filters 6 and 7 in this state is equivalent to a blue filter characteristic represented by curve B in FIG. 10, and a blue signal component can be obtained as color image signal 19.

FIG. 8D shows a state wherein M filter elements 42 and 43 of filters 6 and 7 are inserted in the optical passage. In this state, of course, a magenta signal component can be obtained as color image signal 19.

FIG. 9 shows waveforms of drive signals 17 and 18 supplied from actuator driver 16 to actuators 14 and 15 in correspondence with FIGS. 8A to 8D. In filter 6, when drive signal 17 is OFF, Ye filter element 41 is inserted in the optical passage, and when it is ON, M filter element 42 is inserted in the optical passage. In filter 7, when drive signal 17 is OFF, M filter element 43 is inserted in the optical passage, and when it is ON, Cy filter element 44 is inserted in the optical passage. During period S1, since both drive signals 17 and 18 are OFF, the state shown in FIG. 8A is established, and the red signal component can be obtained. During periods S2, S3, and S0, the states shown in FIGS. 8B, 8C, and 8D are respectively established, and the green, blue, and magenta signal components can be respectively obtained.

During the moving process of filters 6 and 7, when two filter elements in one filter are inserted in the optical passage at the same time, an undesirable signal component which is not correctly color separated is output from image sensor 8. Light shielding regions 45 and 46 are inserted in the optical passage during the moving process of filters 6 and 7. Upon operation of light shielding regions 45 and 46, the undesirable signal component can be prevented from being output from image sensor 8.

Figures 11A, 11B:
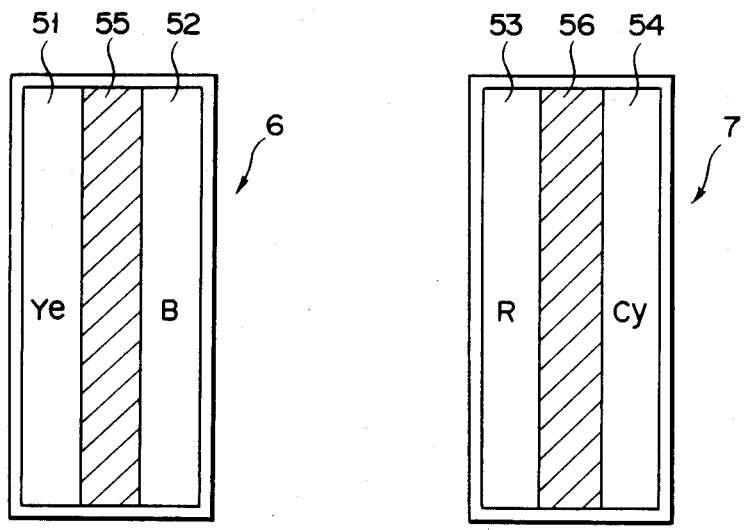
FIGS. 11A and 11B are plan views of first and second color separation filters according to a third embodiment of the present invention.

FIGS. 11A and 11B respectively show first and second color separation filters 6 and 7 according to the third embodiment of the present invention. Filter 6 has Ye filter element 51 and blue filter element (to be referred to as B filter element hereinafter) 52, and filter 7 has R and Cy filter elements 53 and 54. In other words, M filter elements 42 and 43 shown in FIGS. 7A and 7B are respectively replaced with B and R filter elements 52 and 53, respectively. Light shielding regions 55 and 56 are respectively provided between filter elements 51 and 52 and between elements 53 and 54.

FIGS. 12A to 12D show four combinations of positional states of filters 6 and 7, and these four combinations are periodically switched for every line or page. FIG. 12A shows a state wherein Ye filter element 51 of filter 6 and R filter element 53 of filter 7 are inserted in the optical passage. Since Ye and R filter elements 51 and 53 respectively have the spectral characteristics represented by curves Ye and R shown in FIG. 10, the composite spectral characteristic of filters 6 and 7 in the state shown in FIG. 12A is equivalent to the red filter characteristic. Therefore, in this state, the red signal component can be obtained as color signal component 19. FIG. 12B shows a state wherein Ye filter element 51 of filter 6 and Cy filter element 54 of filter 7 are inserted in the optical passage. In this case, the composite spectral characteristic of filters 6 and 7 is equivalent to the green filter characteristic represented by curve G in FIG. 10, in the same manner as in FIG. 4C, and the green signal component can be obtained as color image signal 19. FIG. 12C shows a state wherein B filter element 52 of filter 6 and Cy filter element 54 of filter 7 are inserted in the optical passage. The composite spectral characteristic of filters 6 and 7 in this state is equivalent to the blue filter characteristic, and the blue signal component can be obtained as color image signal 19. FIG. 12D shows a state wherein B filter element 52 of filter 6 and R filter element 53 of filter 7 are inserted in the optical passage. In this state, the magenta signal component is obtained as color image signal 19.

FIG. 13 shows changes in drive signals 17 and 18 supplied to actuators 14 and 15 in correspondence with FIGS. 12A to 12D. In filter 6, when drive signal 17 is OFF, Ye filter element 51 is inserted in the optical passage, and when it is ON, B filter element 52 is inserted in the optical passage. In filter 7, when drive signal 18 is OFF, R filter element 53 is inserted in the optical passage, and when it is ON, Cy filter element 54 is inserted in the optical passage. During period S1, since both drive signals 17 and 18 are OFF, the state shown in FIG. 12A is established, and the red signal component is obtained. During periods S2, S3, and S0, the states shown in FIGS. 12B, 12C, and 12D are respectively obtained, and the green, blue, and magenta signal components are respectively obtained. The magenta signal component is not used in practice.

FIGS. 14A and 14B respectively show first and second color separation filters 6 and 7 according to the fourth embodiment of the present invention. Filter 6 has Ye and B filter elements 61 and 62 separated by light shielding region 65, and filter 7 has M and Cy filter elements 63 and 64 separated by light shielding region 66 as in FIG. 7B. In other words, M filter element 42 in FIG. 7B is replaced with B filter element 63. In this embodiment, when Ye filter element 61 of filter 6 and M filter element 63 of filter 7 are inserted in the optical passage, the composite spectral characteristic of filters 6 and 7 is equivalent to the red filter characteristic. When Ye filter element 61 of filter 6 and Cy filter element 64 of filter 7 are inserted in the optical passage, the composite spectral characteristic of filters 6 and 7 is equivalent to the green filter characteristic. When B filter element 62 of filter 6 and Cy filter element 64 of filter 7 are inserted in the optical passage, the composite spectral characteristic of filters 6 and 7 is equivalent to the blue filter characteristic.

FIGS. 15A and 15B respectively show first and second color separation filters 6 and 7 according to the fifth embodiment of the present invention. Filter 6 has Ye and M filter elements 71 and 72 and light shielding region 75 therebetween as in FIG. 7A, and filter 7 has R and Cy filter elements 73 and 74 and light shielding region 76 therebetween. In other words, M filter element 42 in FIG. 7B is replaced with R filter element 73. In this embodiment, when Ye filter element 71 of filter 6 and R filter element 73 of filter 7 are inserted in the optical passage, the composite spectral characteristic of filters 6 and 7 is equivalent to the red filter characteristic. When Ye filter element 71 of filter 6 and Cy filter element 74 of filter 7 are inserted in the optical passage, the composite spectral characteristic of filters 6 an 7 is equivalent to the green filter characteristic. When M filter element 72 of filter 6 and Cy filter element 74 of filter 7 are inserted in the optical passage, the composite spectral characteristic of filters 6 and 7 is equivalent to the blue filter characteristic.

In the embodiments shown in FIGS. 7A and 7B, FIGS. 11A and 11B, FIGS. 14A and 14B, and FIGS. 15A and 15B, since the transparent substrates of filters 6 and 7 are always inserted in the optical passage, the optical path length between the surface of document 2 and image sensor 8 can be maintained constant.

FIG. 16 shows still another embodiment of the present invention. Optical shutter 20 is inserted in front of image sensor 8. Shutter 20 is controlled by control circuit 11 so as to shield the optical passage during the moving process of filters 6 and 7. Upon operation of shutter 20, an undesirable signal component which is not correctly color separated can be prevented from being output from image sensor 8 during the moving process of filters 6 and 7.

Various other changes and modifications may be made within the spirit and scope of the invention. For example, as an image sensor, a BBD line image sensor or a line image sensor using amorphous silicon as a photoelectric conversion layer can be used in place of a CCD line image sensor. The image sensor need not always comprise a line image sensor in which a plurality of photosensors are aligned in a line but can be one in which photosensor arrays are two-dimensionally arranged.

What is claimed is:

1. A color image reading apparatus comprising:
   an image sensor, constituted by an array of photosensors, for generating an image signal corresponding to an image to be read which is imaged through a predetermined optical passage;
   a first color separation filter which has a first filter element having a predetermined spectral characteristic and is arranged to be movable in a direction perpendicular to the optical passage so that a state wherein said first filter element is inserted in the optical passage and a state wherein said first filter element is deviated from the optical passage can be selectively established;
   a second color separation filter which has a second filter element having a spectral characteristic different from that of said first filter element, and is arranged at a position separated from said first color separation filter in an axial direction of the optical passage to be movable in a direction perpendicular to the optical passage so that a state wherein said second filter element is inserted in the optical passage and a state wherein said second filter element is deviated from the optical passage can be selectively established; and
   first and second drive means for respectively moving said first and second color separation filters so that at least three color image signals can be obtained from said image sensor.

2. An apparatus according to claim 1, wherein said photosensors in said array are aligned in a line in a first direction, said first and second filter elements are formed as stripes and are arranged parallel to each other in the first direction, and said first and second color separation filters are arranged to be movable in a direction perpendicular to the first direction.

3. An apparatus according to claim 1, wherein said first and second filter elements are respectively formed on one major surface of each of first and second transparent substrates, said first and second transparent substrates being arranged so that said major surfaces face each other.

4. An apparatus according to claim 3, wherein said first and second transparent substrates are inserted in the optical passage even when said first and second filter elements are deviated from the optical passage.

5. An apparatus according to claim 1, wherein said first filter element is a yellow filter element and said second filter element is a cyan filter element, and said first and second drive means respectively move said first and second color separation filters so that only said yellow filter element is inserted in the optical passage during a first period, said yellow and cyan filter elements are inserted in the optical passage during a second period, and only said cyan filter element is inserted in the optical passage during a third period.

6. An apparatus according to claim 1, which further comprises: means for inhibiting the imaging of the image to be read to said image sensor during a moving process of said first and second color separation filters.

7. An apparatus according to claim 6, wherein said imaging inhibiting means turns off a light source for illuminating the image to be read during the moving process of said first and second color separation filters.

8. An apparatus according to claim 6, wherein said imaging inhibiting means comprises a shutter inserted in the optical passage.

9. An apparatus according to claim 6, wherein said first and second color separation filters have light shielding regions.

10. A color image reading apparatus comprising:
an image sensor, constituted by a photosensor array, for generating an image signal corresponding to an image to be read which is imaged through a predetermined optical passage;
a first color separation filter which has first and second filter elements having different spectral characteristics, and is arranged to be movable in a direction perpendicular to the optical passage so that a state wherein either said first or second filter element is selectively inserted in the optical passage can be established;
a second color separation filter which has a third and fourth filter elements, the spectral characteristic of at least one of said third and fourth filter elements being different from those of said first and second filter elements, and is arranged at a position shifted from said first color separation filter in an axial direction of the optical passage to be movable in a direction perpendicular to the optical passage so that a state wherein either said third or fourth filter element is selectively inserted in the optical passage can be established; and
first and second drive means for respectively moving said first and second color separation filters so that at least three color image signals can be obtained from said image sensor.

11. An apparatus according to claim 10, wherein said first and second filter elements are formed on one major surface of a first transparent substrate, and said third and fourth filter elements are formed on one major surface of a second transparent substrate, said first and second transparent substates being arranged so that said major surfaces face each other.

12. An apparatus according to claim 10, wherein said first filter element is a yellow filter element, said second filter element is a first magenta filter element, said third filter element is a second magenta filter element, and said fourth filter element is a cyan filter element, and said first and second drive means move said first and second color separation filters so that said yellow and second magenta filter elements are inserted in the optical passage during a first period, said yellow and cyan filter elements are inserted in the optical passage during a second period, and said first magenta and cyan filter elements are inserted in the optical passage during a third period.

13. An apparatus according to claim 10, wherein said first filter element is a yellow filter element, said second filter element is a blue filter element, said third filter element is a red filter element, and said fourth filter element is a cyan filter element, and said first and second rive means move said first and second color separation filters so that said yellow and red filter elements are inserted in the optical passage during a first period, said yellow and cyan filter elements are inserted in the optical passage during a second period, and said blue and cyan filter elements are inserted in the optical passage during a third period.

14. An apparatus according to claim 10, wherein said first filter element is a yellow filter element, said second filter element is a blue filter element, said third filter element is a magenta filter element, and said fourth filter element is a cyan filter element, and said first and second drive means move said first and second color separation filters so that said yellow and magenta filter elements are inserted in the optical passage during a first period, said yellow and cyan filter elements are inserted in the optical passage during a second period, and said blue and cyan filter elements are inserted in the optical passage during a third period.

15. An apparatus according to claim 10, wherein said first filter element is a yellow filter element, said second filter element is a magenta filter element, said third filter element is a red filter element, and said fourth filter element is a cyan filter element, and said first and second drive means move said first and second color separation filters so that said yellow and red filter elements are inserted in the optical passage during a first period, said yellow and cyan filter elements are inserted in the optical passage during a second period, and said magenta and cyan filter elements are inserted in the optical passage during a third period.

16. An apparatus according to claim 10, which further comprises: means for inhibiting the imaging of the image to be read to said image sensor during a moving process of said first and second color separation filters.

17. An apparatus according to claim 16, wherein said imaging inhibiting means turns off a light source for illuminating the image to be read during the moving process of said first and second color separation filters.

18. An apparatus according to claim 16, wherein said imaging inhibiting means comprises a shutter inserted in the optical passage.

19. An apparatus according to claim 10, wherein said first and second color separation filters have light shielding regions.

* * * * *